United States Patent [19]
Etsion et al.

[11] Patent Number: 5,952,080
[45] Date of Patent: Sep. 14, 1999

[54] BEARING HAVING MICROPORES, AND DESIGN METHOD THEREOF

[75] Inventors: Izhak Etsion, Haifa; Ofer Kinrot, Raanana, both of Israel

[73] Assignee: Surface Technologies Ltd., Nesher, Israel

[21] Appl. No.: 09/089,778

[22] Filed: Jun. 3, 1998

Related U.S. Application Data

[62] Division of application No. 08/723,431, Sep. 30, 1996, Pat. No. 5,834,094.

[51] Int. Cl.$^6$ .............................. B32B 3/26; F16C 33/12
[52] U.S. Cl. ..................... 428/156; 428/141; 428/220; 428/338; 428/908.8; 277/301; 277/347; 277/348; 277/411; 277/414; 277/399; 277/400; 277/404; 277/405; 277/406; 384/132; 384/625
[58] Field of Search ..................... 428/141, 156, 428/220, 338, 908.8; 277/301, 347, 348, 411, 414, 399, 400, 404, 405, 406; 384/132, 675

[56] References Cited

U.S. PATENT DOCUMENTS

| | | | |
|---|---|---|---|
| 4,371,220 | 2/1983 | Brucher | 384/371 |
| 4,416,458 | 11/1983 | Takenaka et al. | 277/96.1 |
| 4,573,690 | 3/1986 | Dehart et al. | 277/1 |
| 4,997,192 | 3/1991 | Nagai et al. | 277/96.2 |
| 5,080,378 | 1/1992 | Kagawa | 277/96 |
| 5,441,799 | 8/1995 | Owens et al. | 277/96 |
| 5,529,317 | 6/1996 | Muller | 277/96 |
| 5,645,355 | 7/1997 | Tokushima et al. | 384/133 |
| 5,678,929 | 10/1997 | Parsoneault et al. | 384/112 |
| 5,762,895 | 6/1998 | Schwetz et al. | 423/345 |

Primary Examiner—William P. Watkins, III
Attorney, Agent, or Firm—Mark M. Friedman

[57] ABSTRACT

A method for designing bearings, of improved performance, the load-bearing surfaces of which feature micropores about 2 to 10 microns deep and, preferably, aspect ratios on the order of 7 to 20. The hydrodynamic pressure distribution of a suite of bearing surfaces with different micropore geometries and densities is modeled numerically. The load-bearing surfaces of the bearings are fabricated with micropores having the optimal density and geometry determined by the numerical modeling. Conical micropores may be created by single laser pulses, with the pore size and shape controlled by controlling the laser beam profile, the laser beam power, and the optical parameters of the focusing system.

11 Claims, 9 Drawing Sheets

BEARING HAVING MICROPORES, AND DESIGN METHOD THEREOF

This is a divisional application of U.S. patent application Ser. No. 08/723,431, filed Sep. 30, 1996 now U.S. Pat. No. 5,834,094.

FIELD AND BACKGROUND OF THE INVENTION

The present invention relates to a bearing with improved frictional behavior and, more particularly, to a bearing having a load-bearing surface whose load-carrying capacity is improved by the presence of micropores.

It is well known from the theory of hydrodynamic lubrication that when two parallel surfaces, separated by a lubricating film, slide at some relative speed with respect to each other, no hydrodynamic pressure, and hence no separating force, can be generated in the lubricating film. The mechanism for hydrodynamic pressure buildup requires a converging film thickness in the direction of sliding. In conventional applications, this often is obtained by some form of misalignment or eccentricity between the sliding surfaces, for example, hydrodynamic thrust and journal bearings. Macrosurface structure, particularly in the form of waviness on the sliding surfaces, has been studied in the past for both parallel face thrust bearings and mechanical seals. The load carrying capacity in these cases is due to an asymmetric hydrodynamic pressure distribution over the wavy surface. The pressure increase in the converging film regions is much larger than the pressure drop in the diverging film regions. This is because the pressure drop is bounded from below by cavitation, whereas the pressure increase has effectively no upper limit. Microsurface structure in the form of protruding microasperities on the sliding surfaces also can be used to generate a locally asymmetric pressure distribution with local cavitation. The integrated effect of these microasperities can be useful in producing separating force between parallel sliding surfaces. Asymmetric pressure distribution also can be obtained by depressed surface structures, and various forms of grooves are used in bearings and mechanical seals. See, for example, T. W. Lai, "Development of Non-Contacting, Non-Leaking Spiral Groove Liquid Face Seals", Lubr. Eng. vol. 50 pp. 625–640 (1994).

Microsurface structure in the form of micropores would have several advantages over other microsurface structures, particularly those involving protruding structures, in moving load-bearing surfaces. These advantages include:

1. Ease of manufacturing.
2. The ability to optimize pore size, shape, and distribution using theoretical models.
3. Good scaling capability in stationary machinery.
4. Providing microreservoirs for lubricant under starved lubrication conditions, for example, at startup and after lubricant loss.
5. Providing the capacity to sequester small wear debris.

There is thus a widely recognized need for, and it would be highly advantageous to have, bearings with micropore structure in their load-bearing surfaces and a method for designing the distribution and geometry of the micropores.

SUMMARY OF THE INVENTION

According to the present invention there is provided a method for designing and manufacturing a bearing having a plurality of micropores in a surface thereof, comprising the steps of: (a) selecting a plurality of pore distributions and pore geometries; (b) modeling a hydrodynamic pressure distribution of pairs of bearing surfaces, one bearing surface of each of the pairs having one of the distributions of a plurality of pores of one of the geometries on a sliding face thereof; and (c) selecting an optimal pore distribution and an optimal pore geometry based on the modeling.

According to the present invention there is provided a bearing comprising: (a) a surface region including a surface; and (b) a plurality of micropores having a pore geometry selected by the steps of: (I) selecting a plurality of design geometries, and (ii) modeling a hydrodynamic pressure distribution of pairs of bearing surfaces, one bearing surface of each of the pairs having a plurality of pores of one of the design geometries on a sliding face thereof.

According to the present invention there is provided a bearing comprising: (a) a surface region including a surface; and (b) a plurality of micropores having a substantially rotationally symmetric pore geometry.

I. Etsion and L. Burstein ("A Model for Mechanical Seals with Regular Microsurface Structure", STLE Preprint No. 95-TC-2B-1, October 1995, incorporated by reference for all purposes as if fully set forth herein) have modeled hemispherical pores evenly distributed over the surface area of a seal ring. They studied the effect of pore size and percentage of ring surface area covered by the pores on the operating performance of the seal. The present invention is an extension of that work, including pores shaped like cones and spherical caps. The scope of the present invention includes both a method for designing an optimal micropore density and geometry for the load bearing surfaces of bearings, and the bearings thus designed. Although the load bearing surfaces modeled herein are referred to as "seal rings", it is to be understood that the method of the present invention applies to load bearing surfaces generally, not just to seal rings. Furthermore, the term "bearing" as used herein includes all systems with surfaces in contact that bear loads and move relative to each other, for example reciprocating systems such as pistons in cylinders, and not just bearings per se.

The micropores of the present invention optimally are on the order of several microns to several tens of microns deep and several tens of microns wide. The use of a laser beam to create such micropores has been proposed, notably in BRITE-EURAM Proposal NR 5820, a research project, sponsored by the Commission of the European Communities, to develop self-lubricating silicon carbide bearings. In that project, the lasers were used in a research mode, to create micropores of various controlled sizes, shapes, and density, in silicon carbide surfaces, in order to determine the optimal size, shape, and density to use in silicon carbide bearings. Lasers offer a convenient way to create micropores of specific shapes. A single laser pulse tends to create a substantially conical crater. A wide variety of shapes can be created by a suitable pattern of multiple pulses of carefully controlled location and energy.

DESCRIPTION OF THE PREFERRED EMBODIMENTS

The present invention is of a method for designing load-bearing surfaces of bearings. Specifically, the present invention can be used to design and manufacture bearings whose load-bearing surfaces feature micropores of an optimal density and shape.

The principles and operation of bearing design according to the present invention may be better understood with reference to the drawings and the accompanying description.

Figure 1A:
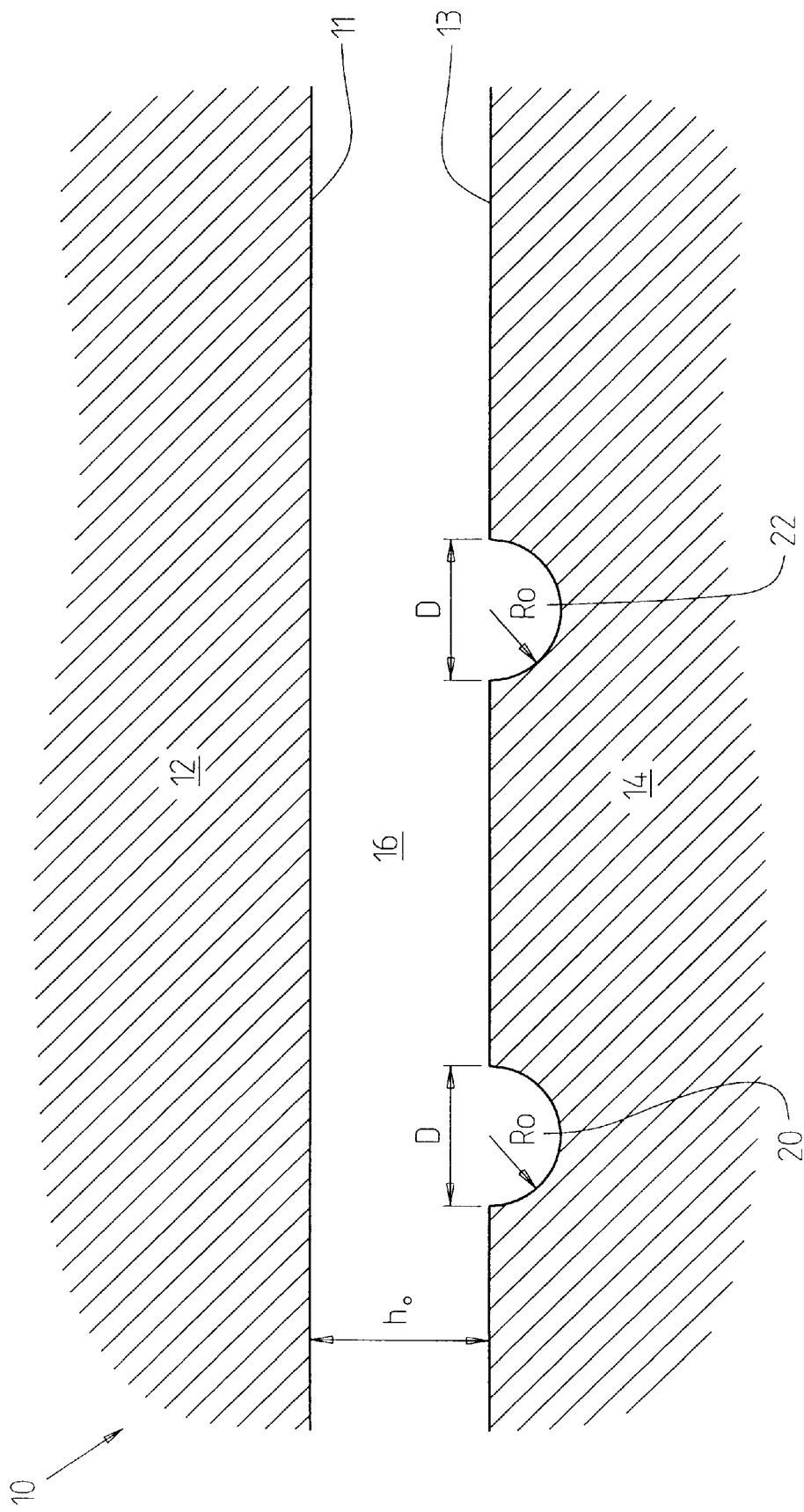
FIG. 1A is a schematic cross section of a bearing with hemispherical micropores.
Figure 1B:
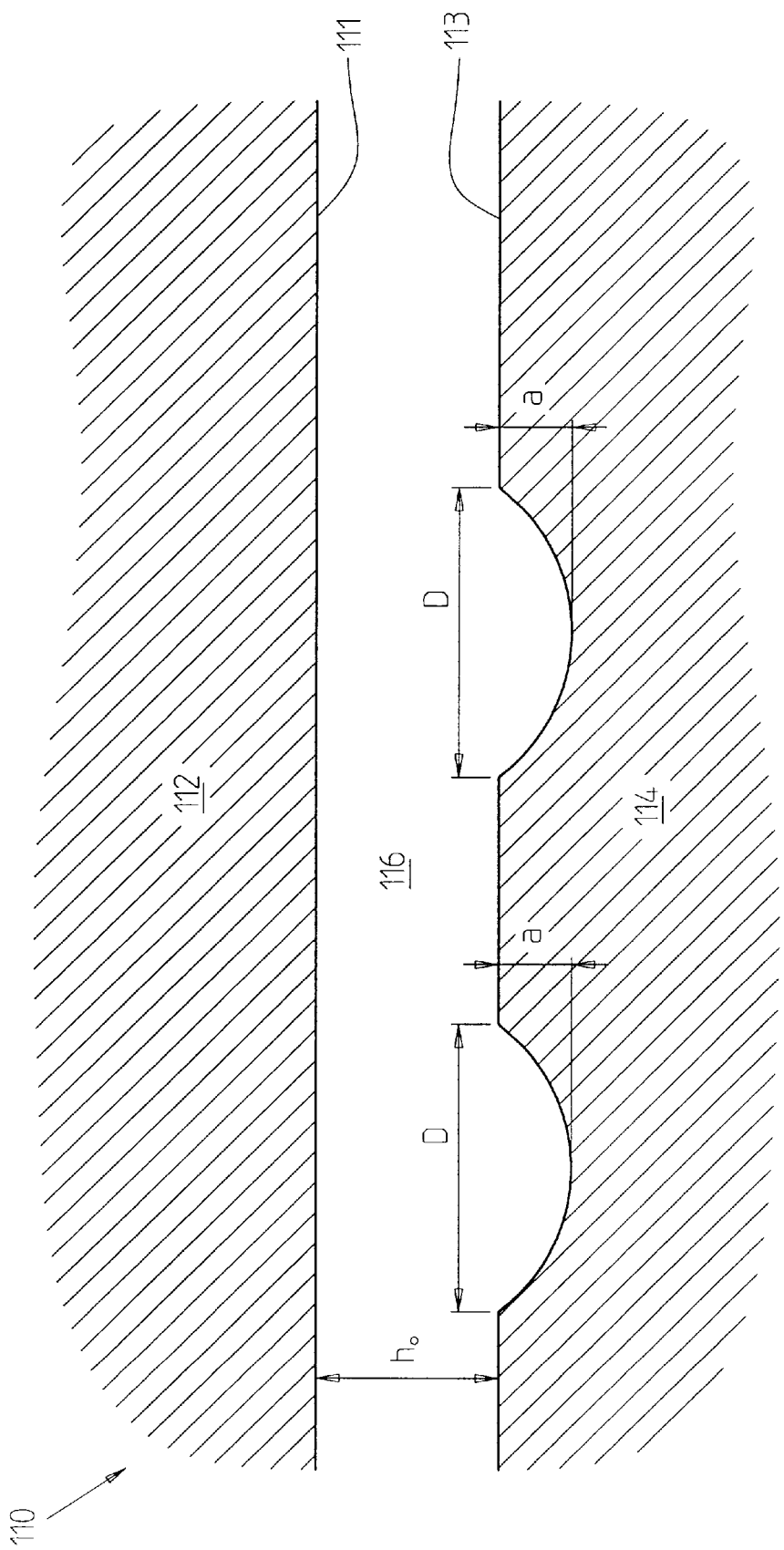
FIG. 1B is a schematic cross section of a bearing with micropores in the form of spherical caps.
Figure 1C:
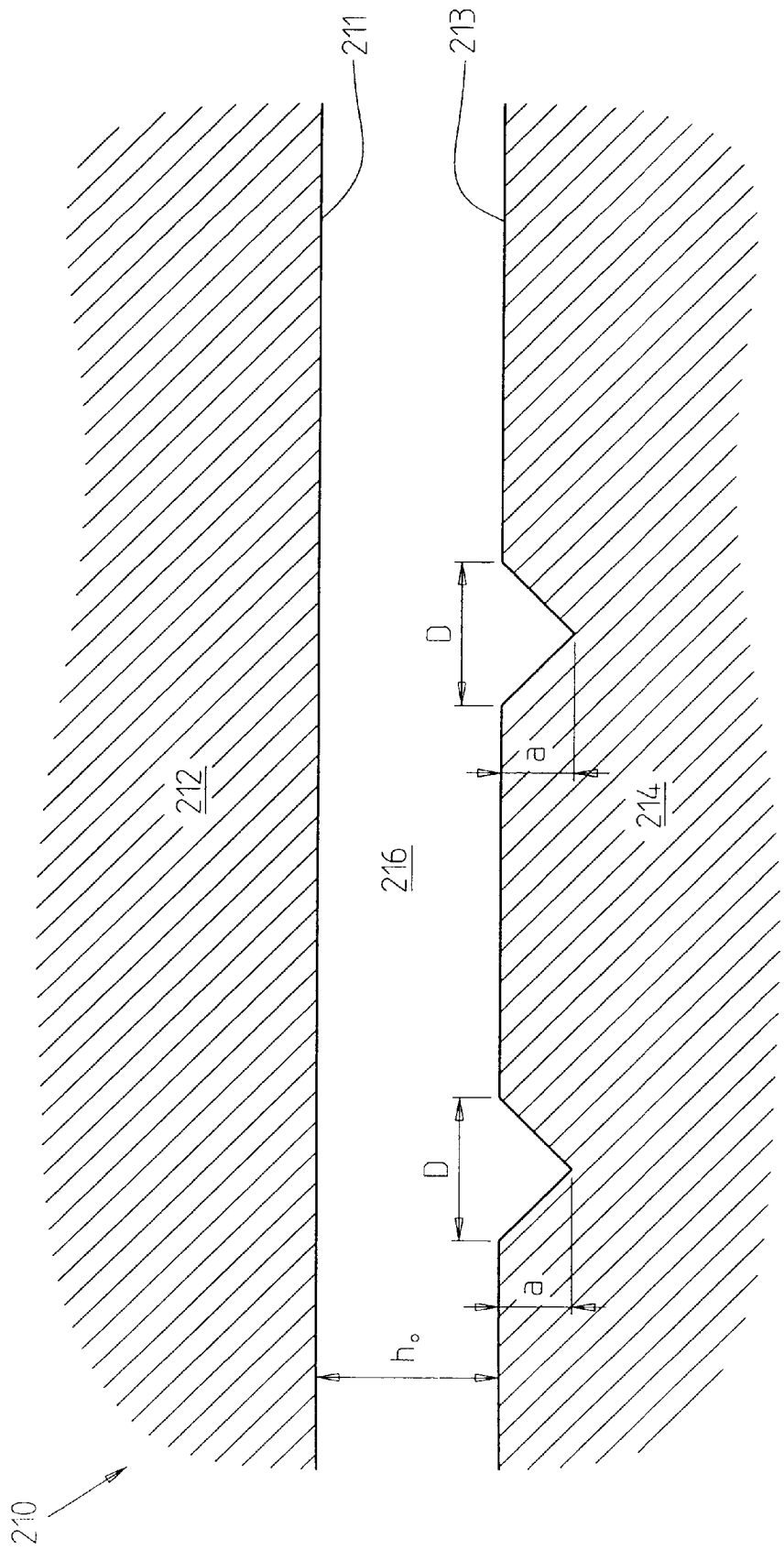
FIG. 1C is a schematic cross section of a bearing with conical micropores.

Referring now to the drawings, the pore geometry and distribution used to model hydrodynamic pressure distribution is shown in FIGS. 1A, 1B, 1C and 2. FIG. 1A is a schematic cross section of a bearing 10 comprising an upper surface 11 of an upper seal ring 12 and a lower surface 13 of a lower seal ring 14, separated by a gap 16 of width $h_0$. In lower surface 13 are two hemispherical pores 20 and 22 of diameter D and radius $R_0$=D/2. This is the geometry that was modeled by Etsion and Burstein. FIG. 1B is a similar schematic cross section of a bearing 110, also comprising an upper surface 111 of an upper seal ring 112 and a lower surface 113 of a lower seal ring 114 separated by a gap 116 of width $h_0$. In lower surface 113 are two pores 120 and 122 shaped as spherical caps of diameter D and depth a. FIG. 1C is a similar schematic cross section of a bearing 210, also comprising an upper surface 211 of an upper seal ring 212 and a lower surface 213 of a lower seal ring 214 separated by a gap 216 of width $h_0$. In lower surface 213 are two conical pores 220 and 222 of diameter D and depth a.

Figure 2:
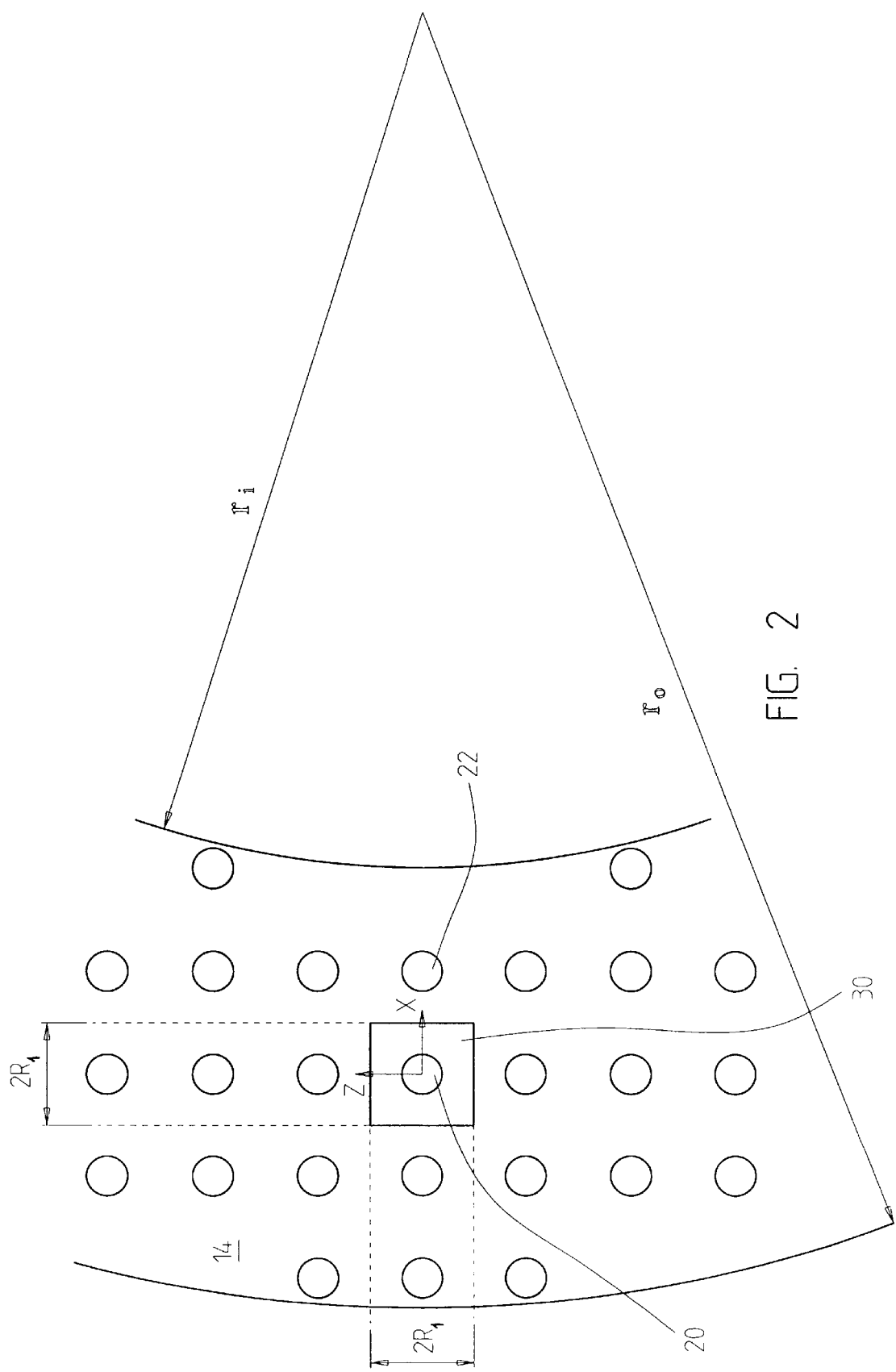
FIG. 2 is a schematic top view of a portion of a seal ring.

FIG. 2 is a schematic top view of a portion of seal ring 14 showing its lateral geometry. Seal ring 14 is an annulus having an inner radius $r_i$ and outer radius $r_o$. Each pore is located in the middle of an imaginary "control cell" of sides $2R_{l \times 2Rl}$. For example, pore 20 is shown in the middle of a control cell 30. Also shown is a portion of the Cartesian coordinate system used in the modeling: the x-axis points to the right and the z axis points up. The y-axis (not shown) points into the plane of the paper. In FIGS. 1A, 1B, and 1C, the y-axis would point from the upper surface (11, 111 or 211) to the lower surface (13, 113 or 213). The pores are arranged in a rectangular grid, but they also could be arranged in any other regular arrangement, for example, an axi-symmetric arrangement. Seal rings 114 and 214 are modeled similarly.

The pores are evenly distributed with an area ratio S that is no more than about 30% of the surface area of seal ring 14, and a pore diameter D that is at least an order of magnitude smaller than the width of seal ring 14, $r_o - r_i$. Hence, the distance between neighboring pores, $2R_l$, is large enough to justify the assumption of negligible interaction between the pores. Although the method and results described herein use a uniform pore distribution, it is easy for one ordinarily skilled in the art to extend the method to non-uniform pore distributions.

The control cell serves as the basic unit for calculations. The basic assumptions used herein are:
1. The seal is an all-liquid noncontacting seal, with parallel faces separated by a constant film thickness $h_0$.
2. Curvature effects of the seal rings can be neglected. Hence, a uniform circumferential velocity U is assumed, and a linear pressure drop from the seal's outer to inner circumference.
3. The seal fluid is a Newtonian liquid having a constant viscosity $\mu$.
4. Half-Sommerfeld condition is assumed whenever cavitation occurs. Although this assumption introduces a certain error in the flow around the control cell, it saves computing time without altering the general trend of the solution for load capacity.

The Reynolds equation for the hydrodynamic pressure components over a single control cell is:

$$\frac{\partial}{\partial x}\left(h^3 \frac{\partial p}{\partial x}\right) + \frac{\partial}{\partial z}\left(h^3 \frac{\partial p}{\partial z}\right) = 6\mu U \frac{\partial h}{\partial x} \tag{1}$$

The local film thickness, h, in the region $2R_l \times 2R_l$ of a control cell is:

$$h = h_0 \tag{2a}$$

outside the pore where $(x^2+z^2)^{1/2}$>D/2.

Over the pore area, the film thickness is, for a hemisphere:

$$h = h_0 + R_0\left[1 - \left(\frac{x}{R_0}\right)^2 - \left(\frac{z}{R_0}\right)^2\right]^{1/2} \tag{2b}$$

for a spherical cap:

$$h = h_0 + a + \sqrt{R^2 - x^2 - z^2} - R \tag{2c}$$

$$R = \frac{a}{2} + \frac{D^2}{8a};$$

where
and, for a cone:

$$h = h_0 + \frac{2a}{D}\left[\frac{D}{2} - \sqrt{x^2 + z^2}\right] \tag{2d}$$

The boundary conditions of Equation (1) are p=0 at $x=\pm R_l$ and at $z=\pm R_l$.

The total local pressure over each control cell is the sum of the pressure p obtained from Equation (1) and the local hydrostatic pressure component $p_s$ given by:

$$p_s = p_i + (p_0 - p_i)\frac{r - r_i}{r_o - r_i} \tag{3}$$

Using dimensionless variables of the form X=2x/D), Z=2z/D, $\xi = 2R_l/D$, $H = h/h_0$, $\psi = D/2h_0$ and $P = p/\Lambda$, where:

$$\Lambda = 3\mu UD/h_0^2 \tag{4}$$

the dimensionless Reynolds equation becomes $$\frac{\partial}{\partial X}\left(H^3 \frac{\partial P}{\partial X}\right) + \frac{\partial}{\partial Z}\left(H^3 \frac{\partial P}{\partial Z}\right) = \frac{\partial H}{\partial X} \tag{5}$$

where H=1 outside the pore and, over the pore, H is equal to the dimensionless equivalent of the right hand side of Equation (2b) or its analogs for non-hemispherical geometries. The dimensionless boundary conditions are P=0 at $X=\pm\xi$ and $Z=\pm\xi$. The dimensionless size $\xi$ of the control cell can be found from the pore ratio S by:

$$16R_i^2 S = \pi D^2 \quad (6)$$

or:

$$\xi = \frac{1}{2}\left(\frac{\pi}{S}\right)^{1/2} \quad (7)$$

The total dimensionless local pressure $P_t$ is the sum:

$$P_t = P + P_s \quad (8)$$

where $P_s$ is the dimensionless local hydrostatic pressure component obtained from Equation (3).

Only control cells with cavitation contribute to the hydrodynamic load-carrying capacity of the seal rings. Hence, before any performance prediction is made, a search for pores with cavitation must be performed. The pores closer to the seal inner radius $r_i$ are those with the higher chances for cavitation. The hydrostatic pressure $P_s$ over these pores may not be high enough to eliminate cavitation. Thus, the search starts from the inner radius $r_i$ and progresses along radial lines towards the outer radius $r_o$. At each point of a cavitating n-th control cell where the total pressure $P_t$ of Equation (8) is negative, the hydrodynamic pressure P is set equal to zero, in accordance with the half-Sommerfeld condition for cavitation. Then the hydrodynamic load support provided by such cavitating n-th control cell is calculated from:

$$\overline{W_n} = \int_{-\xi}^{\xi} \int_{-\xi}^{\xi} P \, dX \, dZ \quad (9)$$

Once a control cell with a positive pressure P over its entire area is found, the search along this radial line is ended and the next radial line is examined.

The total dimensional opening force tending to separate the seal rings is:

$$W = \pi(r_o^2 - r_i^2)(p_o - p_i) + \sum_{n=1}^{N_c} W_n \quad (10)$$

where $N_c$ is the number of cavitating control cells and $W_n$, the dimensional load support of the n-th cell, is related to $\overline{W_n}$ of Equation (9) by:

$$W_n = \overline{W_n} \Lambda R_0^2 \quad (11)$$

It should be noted that $\overline{W_n}$ and hence W was found for a given value of ψ which depends on the seal clearance $h_0$ that is actually unknown a priori. This clearance is the result of a balance between the opening force W and the closing force $F_c$ given by:

$$F_c = \pi(r_o^2 - r_i^2)[p_f + k(p_o - p_i)] \quad (12)$$

where $p_f$ is the spring pressure and k is the seal balance ratio. Hence, an iterative procedure is required to find $h_o$. First a certain clearance is assumed and the corresponding opening force W is calculated and compared with the closing force $F_c$. If balance is not achieved the seal clearance is altered and the procedure is repeated. The iterations continue until a certain convergence criterion is met or until the value of the seal clearance falls below a certain limit. In this case, partial face contact is assumed.

Numerical results for hemispherical micropores were presented in Etsion and Burstein. Herein are presented calculated values of seal clearance for spherical caps and for cones.

Figure 3A:
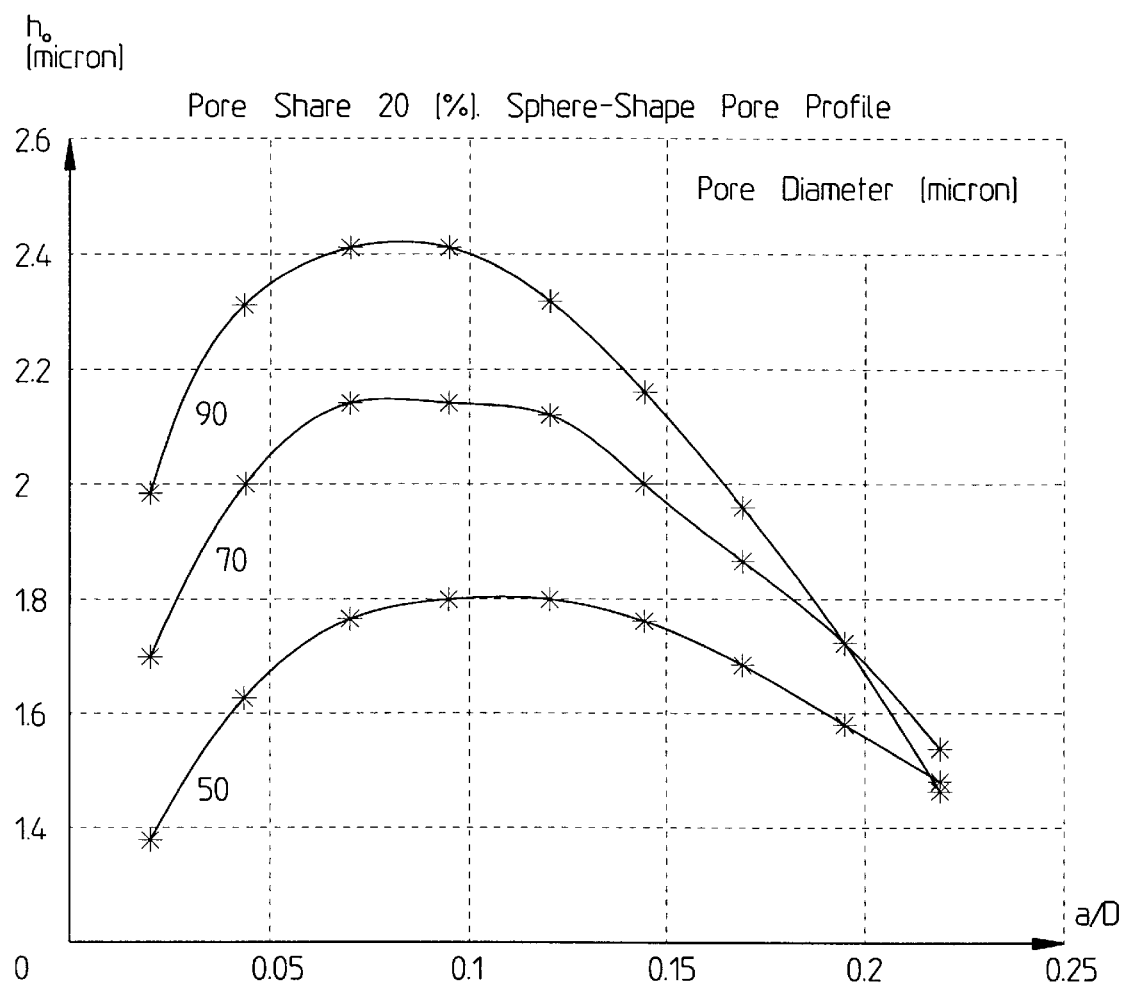
FIGS. 3A and 3B are graphs of clearance vs. depth/diameter ratio for micropores in the form of spherical caps.

FIG. 3A shows values of $h_0$, in microns, vs. the ratio a/D (the reciprocal of the aspect ratio) for micropores in the form of spherical caps, of diameter D equal to 50, 70, and 90 microns, that cover 20% of lower surface 114. The other system parameters in this example are:

Mean sliding velocity U=6.702 m/sec
Inner radius $r_i$=13 mm
Outer radius $r_o$=19 mm
Fluid viscosity $\mu$=0.03 Pa-sec
Inner pressure $p_i$=0.11 Mpa
Outer pressure $p_o$=0.1 Mpa
Spring pressure $p_s$=0.1044 Mpa
Balance ratio=0.75

The highest clearance $h_o$ achieved is 2.412 microns, using micropores 90 microns in diameter and with a ratio a/D of 0.07. Note that the curves decrease monotonically to the right. Hemispherical pores (a/D=0.5) would display significantly poorer performance than the high aspect ratio pores modeled herein.

Figure 3B:
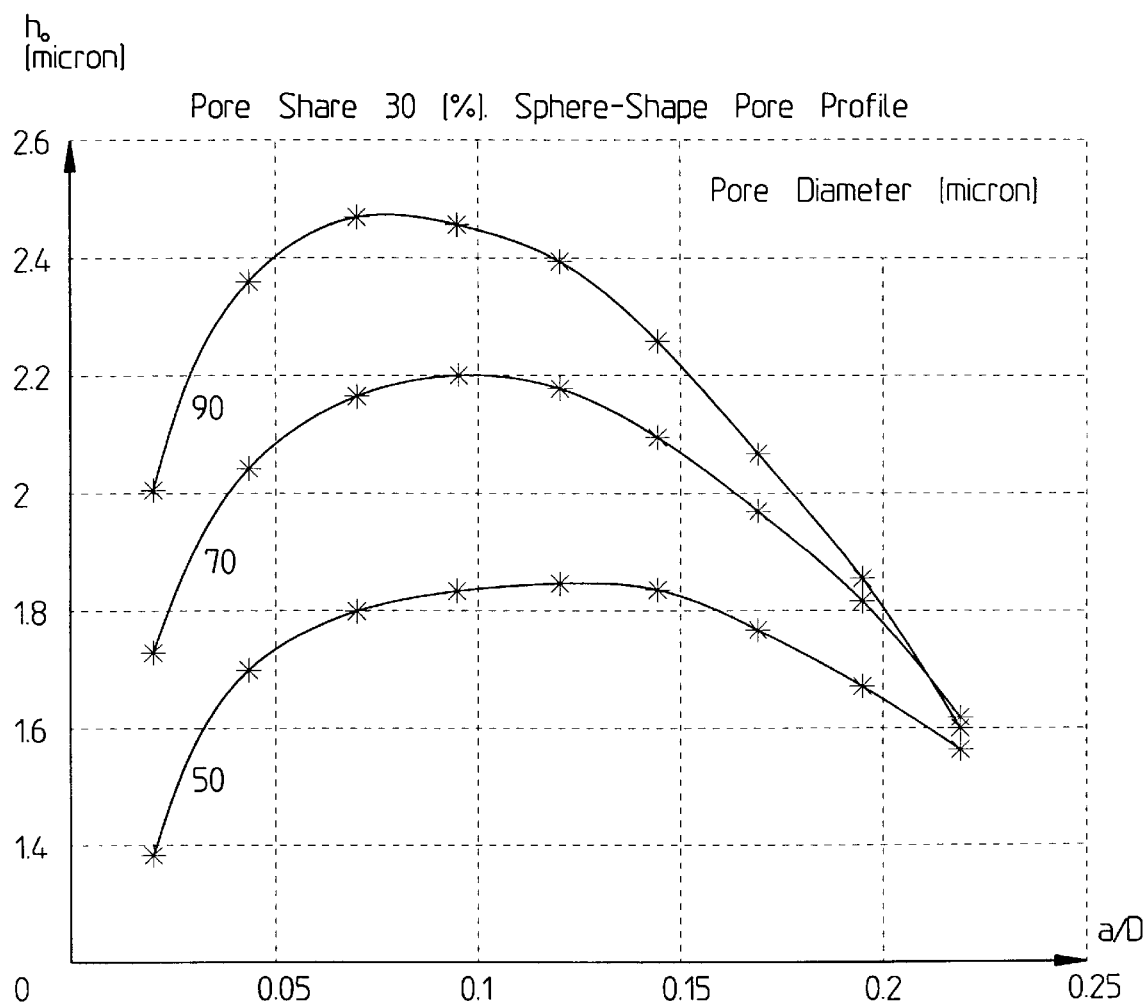

FIG. 3B shows values of $h_0$, in microns, vs. the ratio a/D for micropores in the form of spherical caps, of diameter D equal to 50, 70, and 90 microns, that cover 30% of lower surface 114. The other system parameters are the same as in FIG. 3A. The highest clearance $h_o$ achieved is 2.476 microns, using micropores 90 microns in diameter and with a ratio a/D of 0.07.

Figure 4A:
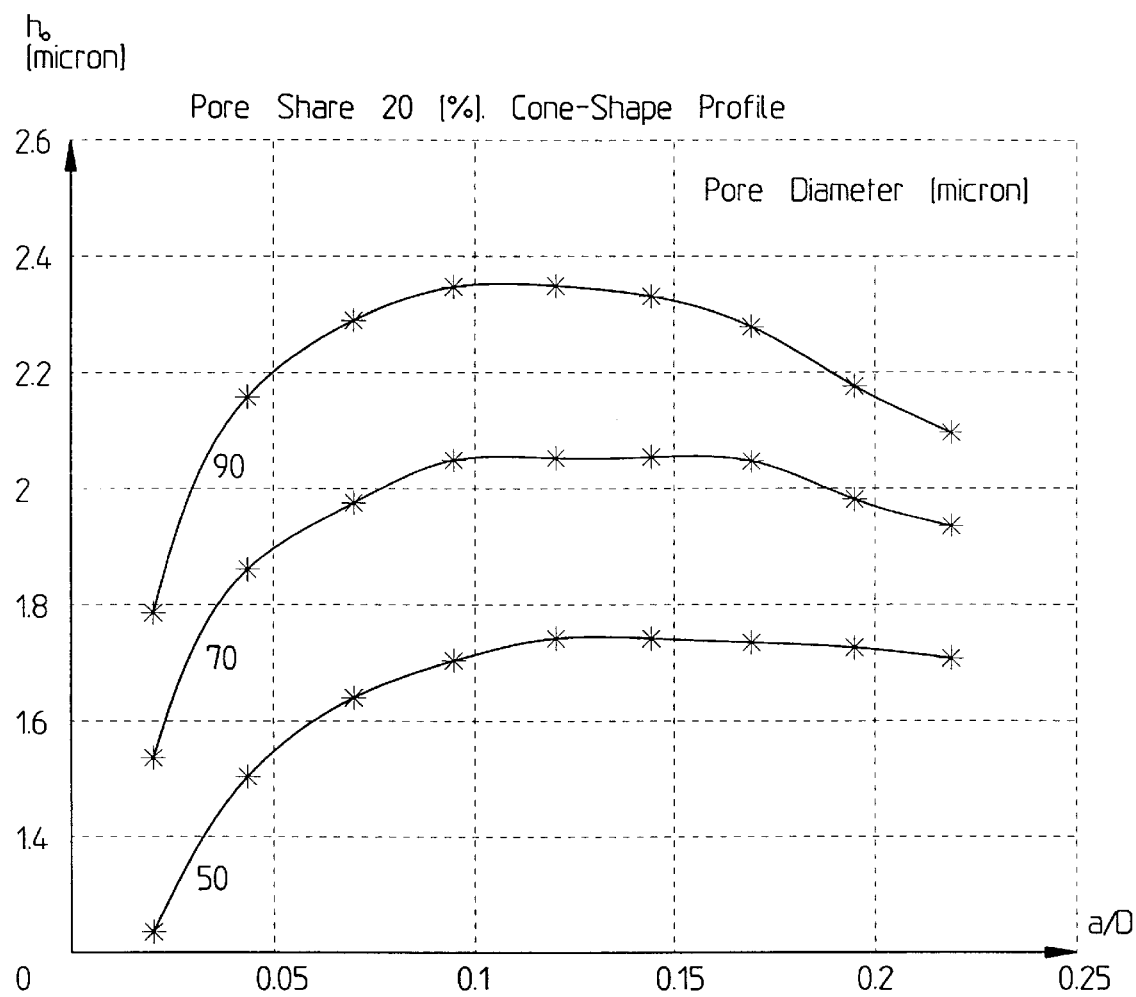
FIGS. 4A and 4B are graphs of clearance vs. depth/diameter ratio for conical micropores.

FIG. 4A shows values of $h_0$, in microns, vs. the ratio a/D for conical micropores, of diameter D equal to 50, 70, and 90 microns, that cover 20% of lower surface 214. The other system parameters are the same as in FIG. 3A. The highest clearance $h_o$ achieved is 2.335 microns, using micropores 90 microns in diameter and with a ratio a/D of 0.095.

Figure 4B:
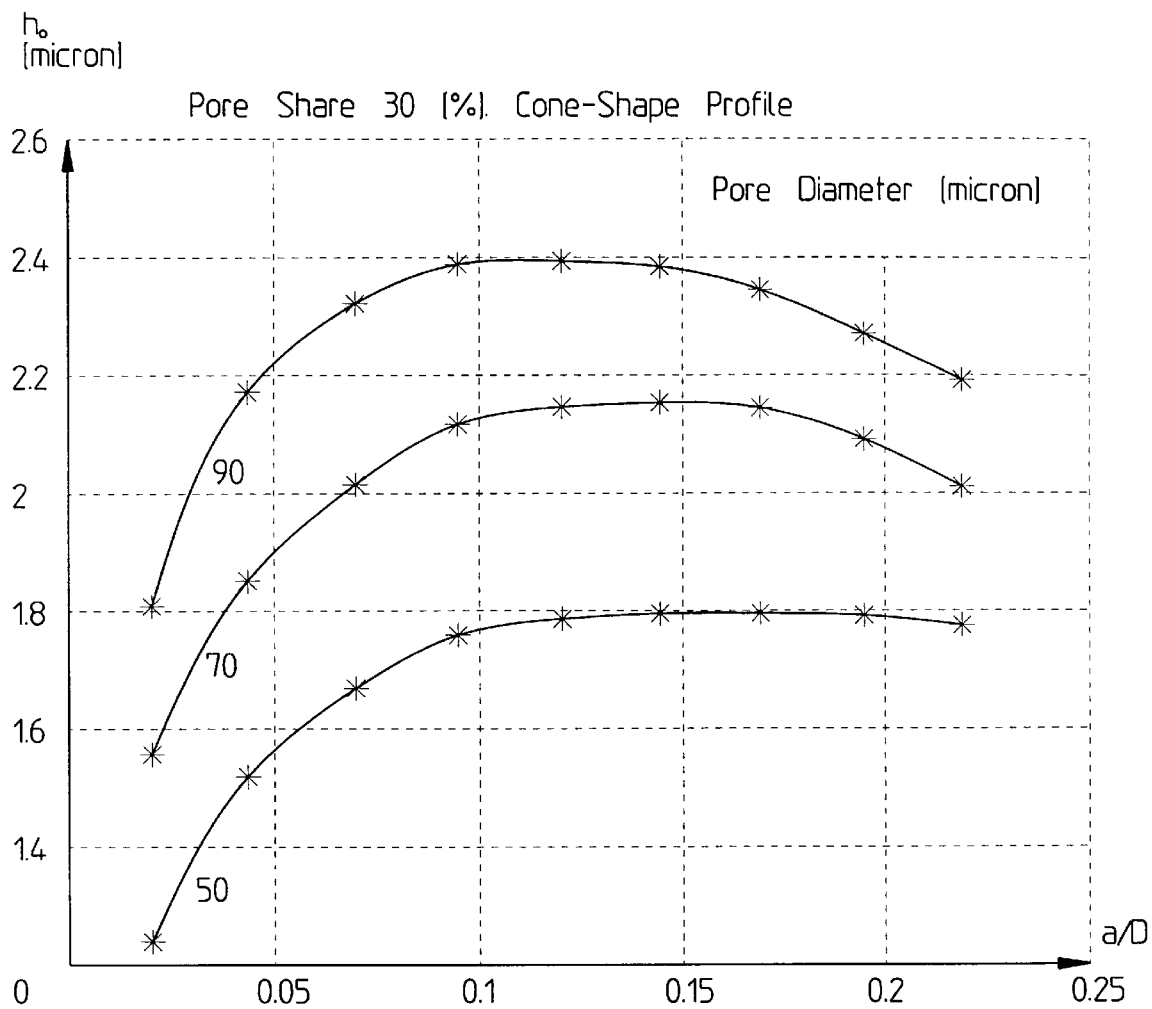

FIG. 4B shows values of $h_0$, in microns, vs. the ratio a/D for conical micropores, of diameter D equal to 50, 70, and 90 microns, that cover 30% of lower surface 214. The other system parameters are the same as in FIG. 3A. The highest clearance $h_o$ achieved is 2.397 microns, using micropores 90 microns in diameter and with a ratio a/D of 0.12.

The results for spherical caps shown in FIGS. 3A and 3B are qualitatively similar to the results for cones shown in FIGS. 4A and 4B. Generally, the best performing micropores have a/D ratios of between 0.05 and 0.15, corresponding to aspect ratios between about 7 and about 20. Nevertheless, as a practical matter, conical micropores are superior to micropores in the form of spherical caps. First, conical micropores are easier to create than spherical micropores. As noted above, a single laser pulse creates a substantially conical micropore. Several laser pulses are needed to shape a substantially spherical micropore. Second, the $h_o$ vs. a/D curves of FIGS. 4A and 4B are generally flatter near their maxima than the $h_o$ vs. a/D curves of FIGS. 3A and 3B, showing that bearings with conical micropores are less sensitive to small variations around the geometric optimum than bearings with spherical micropores. Other things being equal, a bearing with a higher micropore density displays slightly better performance than a bearing with a lower micropore density. This fact must be balanced against the higher cost of fabricating more micropores.

The method of the present invention is based on modeling a hydrodynamic pressure distribution, and therefore applies only to lubricated load-bearing surfaces in motion relative to each other. Nevertheless, the bearings of the present invention include bearings with micropores designed for starved lubrication conditions, for example at the start of relative motion, or under conditions of loss of lubricating fluid. Under these conditions, the micropores must serve as reservoirs for the lubricating fluid. The optimal shape for rotationally symmetric micropores parametrized by a depth a and a diameter D is an a/D ratio of about 0.5, for example, hemispherical pores. The optimal depth of these pores is between about 20 microns and about 60 microns. The most preferred embodiments of the bearings of the present invention include on their load bearing surfaces both micropores optimized for hydrodynamic load bearing conditions and micropores optimized for starved lubrication conditions.

The shape of a substantially conical micropore created by a single laser pulse may be controlled by changing the laser beam profile. The micropores thus created usually are substantially conical; but unwanted perturbations such as bulges or rims around the micropores may be eliminated in this manner. The laser beam profile is changed, either by inserting, in the optical path, apertures that create diffraction effects at the focal spot of the laser, or by allowing multi-mode operation of the laser beam to create a flat-top intensity profile. Another method is to use tailored optics, for example diffractive optics, to create flat-top or annular intensity profiles.

The size of the micropores is controlled by changing the parameters of the optical system used to focus the laser beam onto the surface. The optical system includes an expanding telescope and a focusing lens. Varying the expansion ratio of the telescope and/or the focal length of the lens changes the area and power density of the focal spot. Another parameter that is adjusted to control the micropore size is the pulse energy, which can be lowered from its peak value, by attenuation of the beam or by control of laser power.

Figure 5:
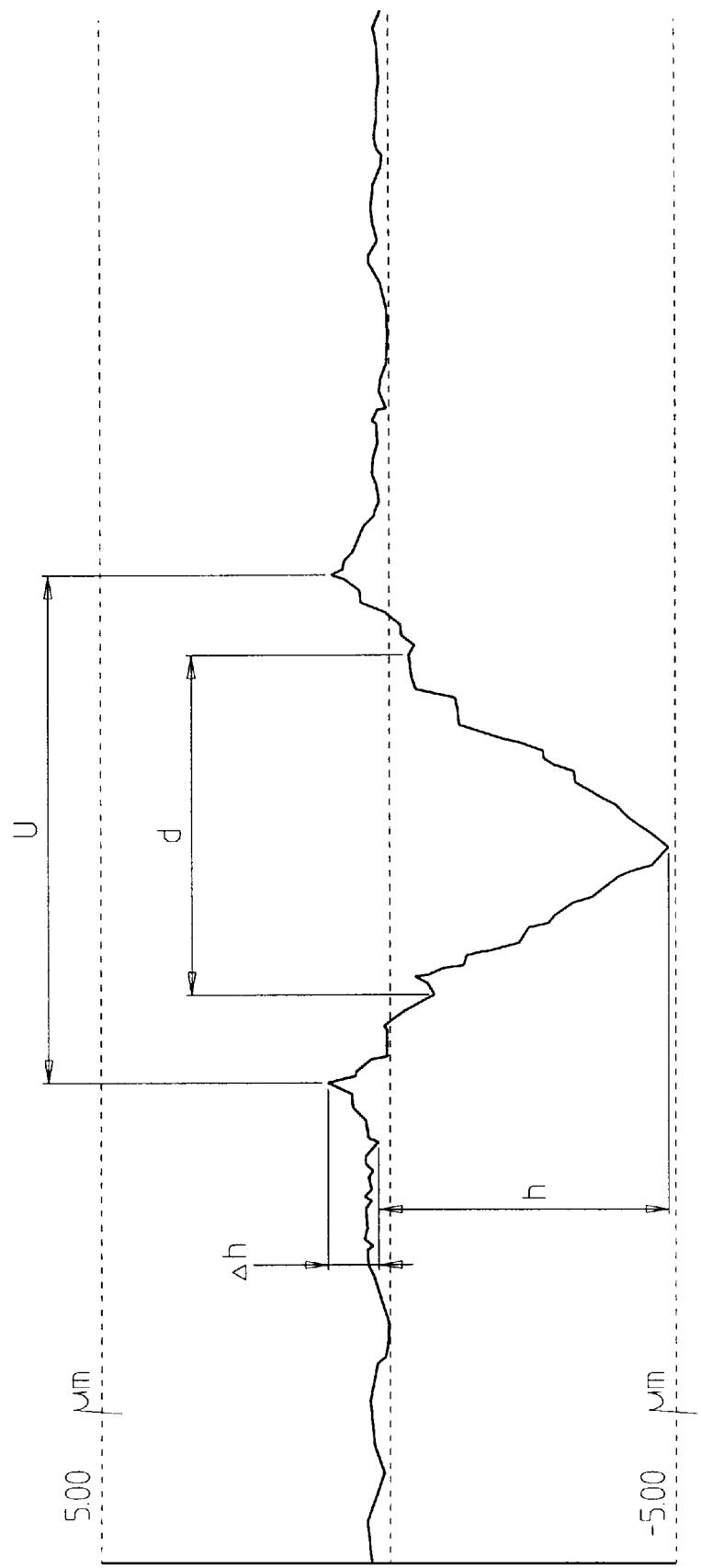
FIG. 5 is a profile of a micropore created in steel.

FIG. 5 shows a profile of a micropore created in steel. Note that the vertical scale in FIG. 5 is exaggerated compared to the lateral scale. Micropores created in steel typically are characterized by a rim around the central hole. The parameters of the laser beam and optical system in this case were:

pulse energy: 4 mJ telescope beam expansion ratio: 1:7.5 focal length of focusing lens: 77 mm

The micropores thus created were about 5 microns deep (h), about 100 microns in diameter (u), and had a rim height (Δh) of between about 0.5 microns and about 1.5 microns. Focusing the laser beam to a tighter spot by making the expansion ratio 1:20 created micropores which are about 7–8 microns deep, have no rims, and have diameters of about 60–70 microns.

Micropores created in silicon carbide had hardly any measurable rim. Using the same parameters as those used to create the micropore shown in the FIG., the micropores created in silicon carbide were about 7–8 microns deep, and about 80 microns in diameter.

The difference between the behavior of steel and silicon carbide is a consequence of the difference between the melting behavior of metals and ceramics. The process of micropore formation in steel involves melting and subsequent boiling and evaporation of the surface layer. The focal spot of the laser has high power density at the center of the spot, sufficient for evaporation of the material. However, outside the center there is an area where the power density is high enough to melt the surface layer but not to evaporate it, thus creating a rim of material that streams away from the focal center. Micropore formation in silicon carbide does not involve melting: the ceramic either evaporates or disintegrates into its components. Thus, negligible rims are created around micropores in silicon carbide. The different micropore depth (5 microns vs. 8 microns) probably is due to lower reflection losses in silicon carbide than in steel.

The bearings of the present invention need not be homogeneous. For example, the surface region of a bearing of the present invention may be of a different material than the rest of the bearing. If the surface region is metallic, it often is important to adjust the process, as described above, to minimize the height of the rims around the micropores, to make the surface between the micropores substantially flat.

While the invention has been described with respect to a limited number of embodiments, it will be appreciated that many variations, modifications and other applications of the invention may be made.

What is claimed is:

1. A bearing comprising:
   (a) a surface region including a surface;
   (b) a first plurality of micropores, in said surface, having a first pore geometry; and
   (c) a second plurality of micropores, in said surface region, having a second pore geometry;
   said first and second pluralities of micropores being arranged in said surface in a regular grid, at least one of said pore geometries being substantially conical geometry.

2. The bearing of claim 1, wherein said first pore geometry is optimized for hydrodynamic load bearing conditions and wherein said second pore geometry is optimized for starved lubrication conditions.

3. The bearing of claim 1, wherein said first and second pore geometries are substantially rotationally symmetric.

4. The bearing of claim 3, wherein said first pore geometry is parametrized by a depth a and a diameter D, and wherein a/D is between about 0.05 and about 0.15.

5. The bearing of claim 4, wherein said micropores of said first plurality are between about 2 microns and about 10 microns deep.

6. The bearing of claim 3, wherein said second pore geometry is parametrized by a depth a and a diameter D, and wherein a/D is about 0.5.

7. The bearing of claim 6, wherein said micropores of said second plurality are between about 20 microns deep and about 60 microns deep.

8. The bearing of claim 1, wherein said micropores are created using a laser.

9. The bearing of claim 8, wherein said surface region is metallic, and wherein said surface is substantially flat in between said micropores.

10. A bearing comprising:
    (a) a surface region including a surface;
    (b) a first plurality of micropores, in said surface, having a first pore geometry; and
    (c) a second plurality of micropores, in said surface region, having a second pore geometry; said first and second pluralities of micropores being arranged in said surface in a regular grid, said first pore geometry being parametrized by a depth a and a diameter D, a/D being between about 0.05 and about 0.15.

11. The bearing of claim 10, wherein said micropores of said first plurality are between about 2 microns and about 10 microns deep.

* * * * *